(12) United States Patent
Kreiss et al.

(10) Patent No.: US 8,285,500 B2
(45) Date of Patent: Oct. 9, 2012

(54) SYSTEM AND METHOD FOR PROVIDING POWER DISTRIBUTION SYSTEM INFORMATION

(75) Inventors: David G. Kreiss, San Diego, CA (US); Daniel S. Brancaccio, Coronado, CA (US)

(73) Assignee: Current Communications Services, LLC, Rochester, NY (US)

( * ) Notice: Subject to any disclaimer, the term of this patent is extended or adjusted under 35 U.S.C. 154(b) by 0 days.

(21) Appl. No.: 13/184,467

(22) Filed: Jul. 15, 2011

(65) Prior Publication Data

US 2011/0270457 A1 Nov. 3, 2011

Related U.S. Application Data

(63) Continuation of application No. 12/355,769, filed on Jan. 17, 2009, now Pat. No. 8,000,913.

(60) Provisional application No. 61/032,468, filed on Feb. 29, 2008, provisional application No. 61/022,469, filed on Jan. 21, 2008.

(51) Int. Cl.
*G06F 1/28* (2006.01)

(52) U.S. Cl. ........... 702/60; 702/58; 702/59; 702/62; 324/424; 324/66; 361/88; 361/80; 361/86; 361/627; 700/293

(58) Field of Classification Search ............ 702/58, 702/59, 60, 62; 324/551, 552, 522, 512, 324/535, 424, 66; 361/8, 80, 86, 78, 93.28, 361/627; 700/293, 291, 286; 340/870.02, 340/870.01, 870.03, 635, 660
See application file for complete search history.

(56) References Cited

U.S. PATENT DOCUMENTS

| | | | |
|---|---|---|---|
| 3,973,087 A | 8/1976 | Fong | |
| 3,973,240 A | 8/1976 | Fong | |
| 4,075,699 A | 2/1978 | Schneider et al. | |
| 4,110,683 A * | 8/1978 | Cason et al. | 324/522 |
| 4,264,960 A | 4/1981 | Gurr | |

(Continued)

FOREIGN PATENT DOCUMENTS

DE 100 59 564 A1 9/2002

(Continued)

OTHER PUBLICATIONS

U.S. Appl. No. 60/947,751.*

(Continued)

*Primary Examiner* — Carol Tsai

(57) ABSTRACT

A system, method and computer program product for processing utility data of a power grid is provided. In one embodiment, the system includes a datamart comprised of a plurality of physical databases storing utility data, a plurality of applications comprising an automated meter application configured to process power usage data from a plurality of automated meters, a power outage application configured to identify a location of a power outage, and a power restoration application configured to identify a location of a power restoration. The system may include an analysis engine comprising a plurality of analysis objects with each analysis object configured to process data to provide a specific analysis, wherein said analysis engine is accessible via one or more of the plurality of applications, and the system may include a report module configured to receive an output from the analysis engine and to output a report. The plurality of applications may also include a fault analysis application, a transformer analysis application, a theft detection application, a power flow application, a substation automation application, a load shed application and others.

19 Claims, 3 Drawing Sheets

U.S. PATENT DOCUMENTS

| | | | | |
|---|---|---|---|---|
| 4,347,575 | A | 8/1982 | Gurr et al. | |
| 4,388,690 | A | 6/1983 | Lumsden | |
| 4,642,607 | A | 2/1987 | Strom et al. | |
| 5,517,423 | A | 5/1996 | Pomatto | |
| 5,550,476 | A * | 8/1996 | Lau et al. | 324/522 |
| 5,565,783 | A * | 10/1996 | Lau et al. | 324/522 |
| 5,625,751 | A | 4/1997 | Brandwajn et al. | |
| 5,675,576 | A | 10/1997 | Kalampoukas et al. | |
| 5,784,441 | A | 7/1998 | Davis et al. | |
| 6,002,260 | A | 12/1999 | Lau et al. | |
| 6,161,103 | A | 12/2000 | Rauer et al. | |
| 6,185,221 | B1 | 2/2001 | Aybay | |
| 6,347,027 | B1 * | 2/2002 | Nelson et al. | 361/64 |
| 6,624,532 | B1 | 9/2003 | Davidow | |
| 6,697,240 | B2 * | 2/2004 | Nelson et al. | 361/64 |
| 6,711,512 | B2 | 3/2004 | Noh | |
| 6,757,248 | B1 | 6/2004 | Li et al. | |
| 6,798,211 | B1 * | 9/2004 | Rockwell et al. | 324/527 |
| 6,854,059 | B2 | 2/2005 | Gardner | |
| 6,980,091 | B2 | 12/2005 | White et al. | |
| 6,998,732 | B2 | 2/2006 | Xing et al. | |
| 6,998,962 | B2 | 2/2006 | Cope et al. | |
| 7,010,437 | B2 | 3/2006 | Lubkeman et al. | |
| 7,031,317 | B2 | 4/2006 | Negishi et al. | |
| 7,136,936 | B2 | 11/2006 | Chan et al. | |
| 7,142,094 | B1 | 11/2006 | Davidow et al. | |
| 7,166,931 | B2 | 1/2007 | Okui et al. | |
| 7,173,938 | B1 | 2/2007 | Davidow | |
| 7,203,622 | B2 * | 4/2007 | Pan et al. | 702/184 |
| 7,321,591 | B2 | 1/2008 | Daniel et al. | |
| 7,333,435 | B2 | 2/2008 | Gerkis | |
| 7,342,883 | B2 | 3/2008 | Szumilas | |
| 7,355,735 | B1 | 4/2008 | Sivan et al. | |
| 7,586,420 | B2 * | 9/2009 | Fischer et al. | 340/635 |
| 7,795,877 | B2 * | 9/2010 | Radtke et al. | 324/530 |
| 7,860,615 | B2 * | 12/2010 | Nelson et al. | 700/286 |
| 7,965,195 | B2 * | 6/2011 | Deaver et al. | 340/660 |
| 7,969,155 | B2 * | 6/2011 | Varghai et al. | 324/521 |
| 8,077,049 | B2 * | 12/2011 | Yaney et al. | 340/660 |
| 2002/0048368 | A1 | 4/2002 | Gardner | |
| 2002/0064010 | A1 * | 5/2002 | Nelson et al. | 361/64 |
| 2002/0138316 | A1 | 9/2002 | Katz et al. | |
| 2003/0033119 | A1 | 2/2003 | Noh | |
| 2003/0227373 | A1 | 12/2003 | Lou et al. | |
| 2004/0001438 | A1 | 1/2004 | Aretz | |
| 2004/0037317 | A1 | 2/2004 | Zalitzky et al. | |
| 2004/0056734 | A1 | 3/2004 | Davidow | |
| 2004/0059963 | A1 | 3/2004 | Simonnet et al. | |
| 2004/0070912 | A1 | 4/2004 | Kopp | |
| 2004/0075535 | A1 | 4/2004 | Propp et al. | |
| 2004/0117330 | A1 | 6/2004 | Ehlers et al. | |
| 2004/0223617 | A1 | 11/2004 | Corcoran et al. | |
| 2004/0233928 | A1 | 11/2004 | Pozsgay | |
| 2005/0063422 | A1 | 3/2005 | Lazar et al. | |
| 2005/0076148 | A1 | 4/2005 | Chan et al. | |
| 2005/0076149 | A1 | 4/2005 | McKown et al. | |
| 2005/0094339 | A1 | 5/2005 | Okui et al. | |
| 2005/0096856 | A1 | 5/2005 | Lubkeman et al. | |
| 2005/0143083 | A1 | 6/2005 | Kwon et al. | |
| 2005/0169056 | A1 | 8/2005 | Berkman et al. | |
| 2005/0200459 | A1 | 9/2005 | White, II | |
| 2005/0251296 | A1 * | 11/2005 | Nelson et al. | 700/292 |
| 2006/0002189 | A1 | 1/2006 | Berkman | |
| 2006/0025891 | A1 | 2/2006 | Budike | |
| 2006/0034330 | A1 | 2/2006 | Iwamura | |
| 2006/0176832 | A1 | 8/2006 | Miceli | |
| 2006/0217936 | A1 | 9/2006 | Mason et al. | |
| 2007/0025244 | A1 | 2/2007 | Ayyagari et al. | |
| 2007/0220907 | A1 | 9/2007 | Ehlers | |
| 2007/0226290 | A1 | 9/2007 | Khorramshahi | |
| 2007/0229295 | A1 * | 10/2007 | Curt et al. | 340/653 |
| 2008/0172312 | A1 | 7/2008 | Di Martini et al. | |
| 2008/0177678 | A1 | 7/2008 | Synesiou et al. | |
| 2008/0183339 | A1 * | 7/2008 | Vaswani et al. | 700/297 |
| 2009/0009180 | A1 * | 1/2009 | Varghai et al. | 324/521 |
| 2009/0125351 | A1 | 5/2009 | Davis, Jr. et al. | |
| 2009/0187284 | A1 | 7/2009 | Kreiss et al. | |
| 2009/0187344 | A1 | 7/2009 | Brancaccio et al. | |
| 2009/0187579 | A1 | 7/2009 | Brancaccio et al. | |
| 2011/0130887 | A1 | 6/2011 | Ehlers | |
| 2011/0270454 | A1 * | 11/2011 | Kreiss et al. | 700/291 |
| 2011/0270550 | A1 * | 11/2011 | Kreiss et al. | 702/60 |

FOREIGN PATENT DOCUMENTS

| | | |
|---|---|---|
| DE | 100 48 348 C2 | 11/2002 |
| DE | 101 47 916 C1 | 5/2003 |
| DE | 101 47 915 C1 | 6/2003 |
| WO | WO-02/37712 A1 | 5/2002 |
| WO | WO-03/010896 A1 | 2/2003 |
| WO | WO-03/030396 A2 | 4/2003 |

OTHER PUBLICATIONS

Kim, W-O et al., "A Control Network Architecture Based on EIA-709.1 Protocol for Power Line Data Communications", *IEEE Transactions on Consumer Electronics*, (2002),650-655.

Gutzwiller, F W., et al., "Homenet: A Control Network for Consumer Applications", *IEEE Transactions on Consumer Electronics*, (Aug. 1983),297-304.

"Non-Operational Data", Utility Automation & Engineering, (Nov. 1, 2003).

"Non-Operational Data: the Untapped Value of Substation Automation", Utility Automation Global Energy Solution, (Sep. 1, 2003).

"The Value of Non-Operational Data", www.kjt.com, (Jan. 1, 2007).

"The Devil in the Transmission Data", Public Utilities Fortnightly, (Jul. 1, 2004).

"Substation Automation", Utility Automation and Engineenering/T&D, (Nov. 1, 2004).

\* cited by examiner

SYSTEM AND METHOD FOR PROVIDING POWER DISTRIBUTION SYSTEM INFORMATION

CROSS REFERENCE TO RELATED APPLICATIONS

This application is a continuation of, and claims priority to, U.S. application Ser. No. 12/355,769, filed Jan. 17, 2009 now U.S. Pat. No. 8,000,913, which claims the benefit of U.S. Provisional Application No. 61/032,468, filed Feb. 29, 2008 entitled "System and Method for Providing Power Line Distribution System Information," and U.S. Provisional Application No. 61/022,469, filed Jan. 21, 2008 entitled "System and Method for Providing Power Line Distribution System Information," all of which are incorporated herein by reference in their entirety for all purposes.

FIELD OF THE INVENTION

The present invention generally relates to systems and methods for managing power transmission and distribution systems, and more particularly to systems and methods for providing and processing power line distribution system information.

BACKGROUND OF THE INVENTION

The power system infrastructure includes power lines, transformers and other devices for power generation, power transmission, and power delivery. Various computer systems may control portions of the power system infrastructure. Objectives of a utility company are to generate, transmit and deliver power to customers in a reliable, efficient cost effective manner, which includes reducing maintenance costs and power losses. The power system infrastructure typically includes thousands of power lines, transformers and other components, many of which have been in place for many years. Based upon the size of the power system, the number of components included and the relative aging of various components, maintaining the utility company objectives is challenging.

There is a need for systems and methods that allow a utility or other central provider to access, monitor and control various power system components. Further, there is a need for systems and methods that allow a utility to more effectively distribute power, to respond to varying demands for power, and to maintain various portions of the power system. Various systems are sometimes available to perform one of more functions for improving power system performance. However, there is a need for an integrated information management and control system that can obtain, process, and manage information from various systems that utility companies may already have in place. These and other needs may be addressed by one or more embodiments of the present invention.

SUMMARY OF THE INVENTION

The present invention provides a system and method of a system, method and computer program product for processing utility data of a power grid. In one embodiment, the system includes a datamart comprised of a plurality of physical databases storing utility data, a plurality of applications comprising an automated meter application configured to process power usage data from a plurality of automated meters, a power outage application configured to identify a location of a power outage, and a power restoration application configured to identify a location of a power restoration. The system may include an analysis engine comprising a plurality of analysis objects with each analysis object configured to process data to provide a specific analysis, wherein said analysis engine is accessible via one or more of the plurality of applications, and the system may include a report module configured to receive an output from the analysis engine and to output a report. The plurality of applications may also include a fault analysis application, a transformer analysis application, a theft detection application, a power flow application, a substation automation application, a load shed application and others.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, devices, communication systems, computers, terminals, components, techniques, data and network protocols, power line communication systems (PLCSs), software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, devices, communication systems, computers, terminals, components, techniques, data and network protocols, software products and systems, operating systems, development interfaces, and hardware are omitted so as not to obscure the description of the present invention.

Typically, utility IT (information technology) systems are computer systems with applications that process a specific set of data to provide a specific analysis. In addition, such IT systems are stand alone systems and rarely communicate with each other or have access to the same data. If a utility wishes to add a new application, it often needs to be built from the ground up with its own data access, reporting modules, etc. The present invention integrates the IT systems of the utility to allow them to share data, analysis engines, reporting modules, and other backend applications.

Figure 1:
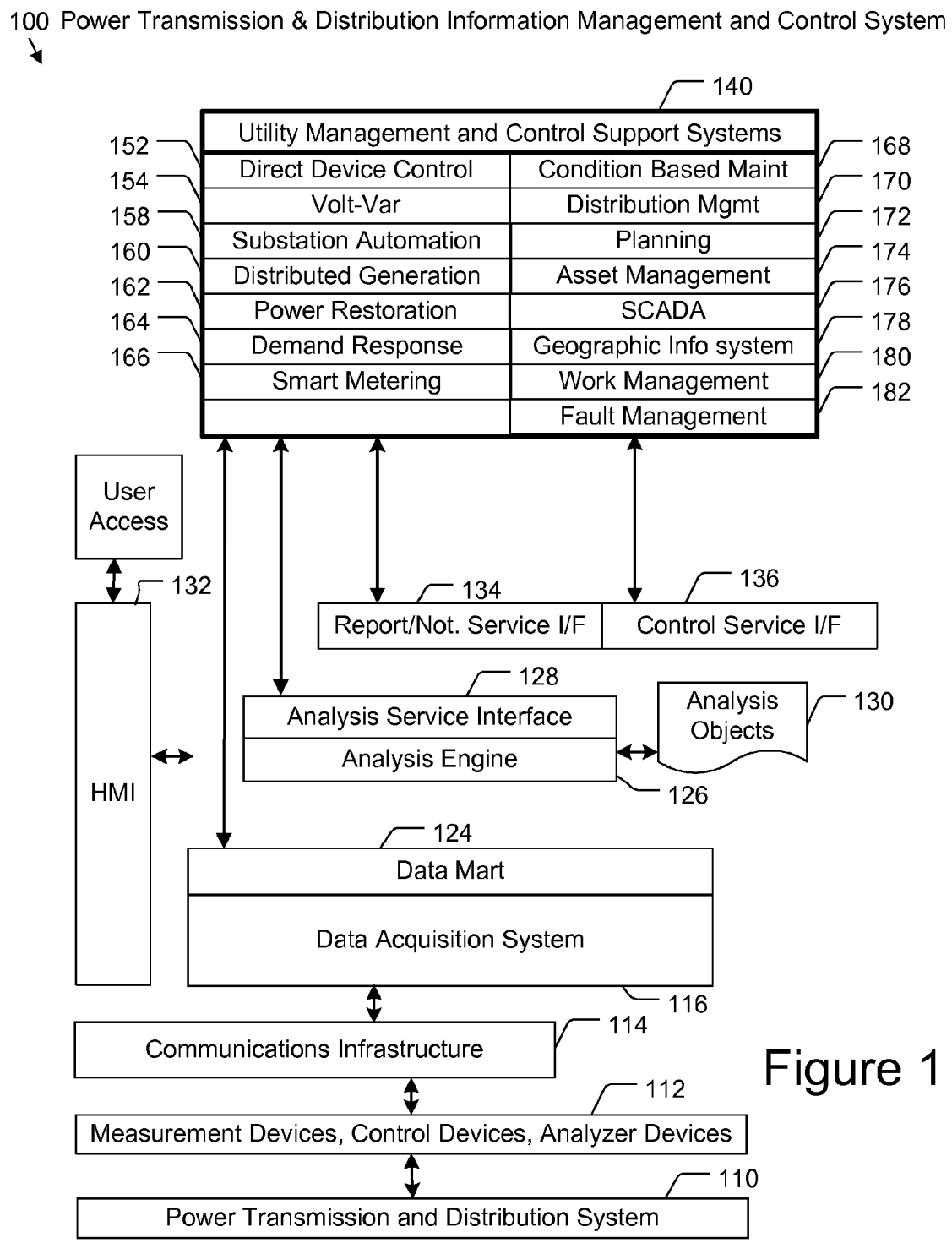
FIG. 1 is a block diagram of a power transmission and distribution information management and control system, according to an example embodiment of the present invention.

According to an example embodiment of the present invention, a system for power transmission and distribution information management and control (PTDIMC) is provided. FIG. 1 shows an example embodiment of the PTDIMC system 100 and the power transmission and distribution system 110. Various measurement devices, control devices and analyzer devices 112 are located throughout the power transmission and distribution system 110 and connected through a communication infrastructure 114 to the other portions of the PTDIMC system 100. The PTDIMC system 100 may implement a distributed computing architecture to manage, control and maintain power transmission and distribution operations. Various utility management and control support systems 140 with associated applications are integrated into the distributed computing architecture.

A data acquisition system 116 acquires operational and non-operational data for storage in a data mart 124 from which the data may be provided to various utility management and control support systems 140. An analysis engine 126 may be accessed by the various utility management and control support systems 140 to analyze recently acquired and historical data. The analysis engine may be configured to cause the report and notification generator 135 to output an alarm notification if processing of utility data satisfies one of a plurality of predetermined conditions (e.g., such as those associated with applications 202-232). Various utility computer systems (IT) may execute applications comprising the utility management and control support systems 140, and may access the analysis engine 126. Technicians and other personnel with appropriate privileges may access the applications and PTDIMC system 100 using human machine interfaces 132 which allows access to the report and notification interfaces 134 and control interfaces 136. The data processing may enable real time and predictive responses, rather than just reactive responses, to instantaneous disruptions. The PTDIMC system 100 together with the power transmission and distribution system 112 being monitored, analyzed and controlled is referred to herein as a smart grid.

Power Transmission and Distribution System 110: A given utility or service provider may operate and control various power grids which form all or part of a given power transmission and distribution system 110. A power distribution network may include a substation, substation transformers, distribution transformers, medium voltage power lines, and low voltage power lines, along with various switching capacitors, capacitor banks, relays, re-closers, line protectors and other infrastructure. Various power distribution networks may be connected via medium voltage power lines, high voltage power lines, and other infrastructure to form the power transmission and distribution system 110 (also referred to herein as the power grid).

Measurement Devices, Control Devices and Analyzer Devices 112: Various measurement devices, control devices and analyzer devices 112 are located throughout the power transmission and distribution system 110. Measurement devices may be coupled to various power lines, at the substation, at customer premises, and be located near various power distribution system components. A measurement device may measure or detect various power distribution system parameters at a given location, such as current, voltage, power usage, detection of a power outage, detection of water in a pad mount transformer enclosure, detection of an open pad mount transformer enclosure, detection of a street light failure, power delivered to a transformer, power factor, dissolved gases, switch configuration, capacitor bank configuration, breaker configuration, power delivered to a downstream branch, data of the harmonic components of a power signal, load transients data, load distribution data, and/or other characteristics. Control devices may be coupled to or be part of power system switches. Analyzer devices may be located at various substations, near distribution transformers and at other locations. Among the analyzers may be intelligent electronic devices (IEDs), such as power quality analyzers, transformer data concentrators, dissolver gas analyzers, and digital fault recorders.

Communication Infrastructure 114: Various commands may be sent to the measurement devices, control devices, and analyzer devices 112 via a communications infrastructure 114. Also, data may be obtained from the measurement devices, control devices, and analyzer devices 112 via the communications infrastructure 114. In various embodiments the communication infrastructure 114 may comprise wired and/or wireless media. For example, the communication infrastructure 114 may be formed by mobile telephone network, paging network, WiMAX network, wide area network (WAN), coaxial cable network, DSL network, global network (e.g., internet) or some combination thereof. In addition, in some embodiments all or a portion of the communication infrastructure 114 may be provided by a power line communication system (PLCS). Detailed descriptions of examples of a PLCS, along with system elements such as CT bridges, backhaul points, repeaters (e.g., a CT bridge acting as a repeater), power line servers, sensors, other components and their functionality are provided in U.S. Pat. No. 7,224,272, issued May 29, 2007, entitled "Power Line Repeater System and Method," which is incorporated herein by reference in its entirety for all purposes. Additional descriptions of such devices, sensors, components and their functionality is provided in U.S. patent application Ser. No. 11/423,206 filed Jun. 9, 2006, issued as U.S. Pat. No. 7,761,079, entitled "Power Line Communication Device and Method," which is incorporated herein by reference in its entirety for all purposes.

In an example embodiment in which the communication infrastructure 114 includes a PLCS, an access device (e.g., CT bridges, backhaul points, repeaters) may connect to and communicate with one or more communication devices via a low voltage power line. For example, communications may be transmitted from the access device along power lines of the power transmission and distribution system 110, to a power line modem coupled to a measurement device, control device or analyzer device 112, and from the power line modem along power lines to the access device. The PLCS may also be used to perform automated meter reading.

Data Acquisition System 116: The data acquisition system 116 may include various adaptors, drivers and other software modules for communicating with the various measurement devices and in some instances, for storing data in the data mart 124. In addition, various utility management and control support systems 140 may access the data acquisition system 116 to obtain data and/or to send control messages to equipment. A data service interface forming part of the data mart 124, for example, may determine which data base adaptor to specific data is requested from a given application (or from the analysis engine 126 discussed below). The adaptors may be configured to send commands and receive data from the datamart 124 and the measurement devices, control devices and analyzer devices 112.

The various data acquired by the PTDIMC may be stored in one or more distributed databases (e.g., distributed among the utility's IT systems) that form part of the data mart 124, which also includes a data integration server. The datamart 124 provides a single logical repository for all (or most) of the data used by an electric utility. The datamart includes a plurality of physical databases some of which may be physically remote from each other. The data of these databases is typically collected and/or maintained by separate departments of the electric utility and in some instances, by one or more third parties. Generally, only the department of the utility collecting and maintaining the data typically has access to its associated data. In embodiments of the present invention, access to the utility data by other departments and/or third parties may be provided via a Utility Data Integration System (UDIS) forming part of the data mart. The UDIS facilitates controlled integration of, and access to, data of the data mart (and in some embodiments, localized processing of that data) by various departments within the utility and by third parties, all of which typically would not otherwise have such access.

In one example, a plurality of IT systems (such as those corresponding to different utility departments) house diverse utility data such as data related to asset management, work management, Supervisory Control and Data Acquisition (SCADA), GIS, substation automation, data management system (DMS) and/or other departmental systems of one or more utility companies. Such data may be integrated in accordance with the present invention to form a data mart. Each IT system may be configured to respond to a collection of commands received via the Utility Data Integration System from other IT systems. For example, a first IT system (of a first department or remote third party entity) may invoke a command in a second (different) IT system. This command may be as simple as "read data" such as a request for voltage and current data (waveform or RMS) which the first IT system uses to compute the power factor or power. Alternately, the command may be more complex such as a command to run an analytical algorithm (resident on the second IT system) such as a command to compute (and return) the power and/or power factor. Such invoking may comprise actually passing the command but a preferred method may be to pass data or a "flag" to the receiving IT system. However, the preferred method requires the secondary IT system have an interface that recognizes the data and/or flags. (there may be a difference as stated here.

In some embodiments, the UDIS may include, or provide access to, applications that are reused by a multitude of the IT systems. Thus, instead of creating the same application for different IT systems, the UDIS provides access to the application for many IT systems. In summary, the architecture of the UDIS supports four unique interface services that perform four tasks: (1) Data Interface Service (e.g., collecting and serving data), (2) Analysis Interface Service (e.g., analyzing data), (3) Notification and Reporting Interface Service (e.g., generating alarms and reports), and (4) Control Interface Service (e.g., controlling equipment).

There are three general categories of data that may be accessed. One category of data that may be acquired is utility measurement data, (e.g., actual raw measurement data from any of the measurement devices; output data from any of the analyzer devices; configuration data from any of the control devices). Another category is asset property data, which comprises data pertaining to equipment such as transformers, sensing devices, communication devices and other equipment which form part of a power transmission and distribution system 110 or the communication infrastructure 114. The asset property data may include identifying data and other information about the asset. For example, a transformer's property data may include, among other properties, the transformer's power rating, operating efficiency, location, date of installation, and date of last service. A third category of data may include utility system topology data, which comprises asset connectivity data. In a sense, the power transmission and distribution system 110 may form a network of nodes from which data is collected. Network topology refers to the connectivity of the various nodes within the power transmission and distribution system 110. In various embodiments, a node within a network's topology may be a consumer's utility meter, a distribution transformer, a power line communication device serving a neighborhood, or a back haul device. By allowing access to the utility measurement data, the properties of the asset obtaining the measurement data, and the location of the asset within the network topology, extensive analysis may be performed for various purposes. Detailed descriptions of examples of a data acquisition system and data mart are provided in U.S. patent application Ser. No. 12/353,850 filed Jan. 14, 2009, entitled "System, Method and Product for Processing Utility Data," which is incorporated herein by reference in its entirety for all purposes.

Analysis Engine 126, Analysis Service Interface 128, and Analysis Objects 130: The PTDIMC 100 may include an analysis engine 126, an analysis service interface 128, and analysis objects 130. The analysis service interface provides versatility allowing various applications to access specific analysis program modules used by various utility management and control support systems 140. Specific analysis program modules may be perform specific analyses.

The analysis engine 126 controls the execution of one or more analysis rules, which includes calling one or more analysis objects to process data. More specifically, the "rule" is created by a subject matter expert (SME) module. The SME has a list of all the analysis objects supported by the system and then links them together in the rule. The analysis objects comprise an extensive library of domain specific utility objects. The analysis objects know what data is needed to perform the function and retrieve the data via the data mart. The Report and Notification Service Interface 134 generates a report, chart or action from the analysis results.

The analysis objects 130 is a group of software objects (e.g., COM, .NET assemblies, DLLs, etc.) that encapsulate analysis methods and are available to other components of the analysis engine 126. Each object is designed to perform a specific function or analytical procedure. An example of a simple smart object is the computing of power factor from recorded kW and kVAR values, while a more complex smart object is a neural network based capacitor signature analysis of a voltage waveform. Given waveform (oscillography) data collected from devices (nodes on the grid) these, more complex, reusable smart objects, using a combination of SME developed rules-based expert systems and SME developed fuzzy logic systems various waveform and other data may be analyzed.

Report and Notification Service Interface 134: The various utility management and control support systems 140 and the analysis engine 126 may execute various computer programs that gather data for presentation in a report or that analyze data to detect conditions that require a notification. Such reports may be compiled and saved, output or otherwise delivered (e.g., transmitted, displayed or printed) by the report and notification service interface 134. Such notifications also may be generated and saved, output (e.g., transmitted; displayed; printed) or otherwise delivered (e.g., email) by the report and notification service interface 134.

Control Service Interface 136: The control service interface 136 may be accessed by one or more utility management and control support systems 140, and by the analysis engine 126 to send commands to various measurement devices, control devices and analyzer devices. For example the control service interface 136 may format commands from specific applications to execute on one or more of the utility management and control support systems 140 or the analysis engine 126, and forward the command to the data acquisition system 116. The data acquisition system 116 in turn may send the command to a specific measurement device, control device or analyzer device 112 via the communications infrastructure 114.

Human Machine Interface 132: Technicians and other utility personnel or other users having appropriate privilege may access the PTDICM 100 at a human machine interface 132 hosted at a personal computer or other computing device. Such access may occur via the internet, via a wide area network, via a local area network or by other access to one or more components of the PTDIMC. For example a browser based HMI may access a web server that provides full functional access to remote users through the Internet or a company's intranet. In an example embodiment the browser based HMI may give users a graphical view of the state of the smart grid, indications on whether any alarms have occurred, full access to reports, and a detailed data analysis and manipulation through data presentation, computation, and graphing applications. The console (administrative) HMI 132 provides an interactive environment for a user to access all administrative functions including setup and maintenance.

As another example, an HMI 132 may be an application installed on a PC at a power substation or a utility command center. From the console various functions may be performed, such as: set up and maintain system databases; add or change graphical HMI layouts; add, delete, or edit monitors or assets and their properties including download intervals; add, delete, or edit alarms and automated reports; add, delete, or edit rate schedules; add, delete, or edit local or Web users and assign names, passwords, and viewing levels; acknowledge or delete alarms; and view reports and data via report packages.

Additional description of the analysis engine 126, analysis service interface 128, analysis objects 130, the report and notification service interface 134, the control service interface 136 and the various human machine interfaces 132 are provided in U.S. patent application Ser. No. 12/355,361 filed Jan. 16, 2009, entitled "System, Method and Computer Program Product for Analyzing Power Grid Data," which is incorporated herein by reference in its entirety for all purposes.

Utility Management and Control Support Systems 140:

The PTDIMC system 100 implements a distributed architecture integrating many utility company control systems and information technology systems. For example, each of various utility management and control support systems 140 may be implemented by one or more computing devices (co-located or distributed), such as workstations or server computers which run applications for performing specific system functions. A given application may execute on a given support system 140 or include modules (or sub-modules) distributed among computer systems. An application may interface with the analysis engine 126, various service interfaces 128, 134, 136, the data mart 124 Data may be accessed from the data mart 124 and, in some cases, from measurement devices, control devices and analyzer devices 112. Users may monitor, control and analyze operations using a human machine interface 132 that permits access to one or more utility management and control support systems 140. Examples of utility management and control support systems 140 that may form part of the PTDIMC system 100 include: direct device control system 152, volt-VAR system 154, substation automation system 158, distributed power generation system 160, distributed power restoration system 162, demand response system 164, automated metering 166, condition based maintenance 168, distribution management system 170, planning 172, asset management 174, supervisory control and data acquisition (SCADA) system 176, geographic information system (GIS) 178, work management 180 and fault management 182. Additional details of the applications of each of these systems 152-182 follows in the next section.

Direct Device Control System 152: Individual devices among the measurement devices, control devices and analyzer devices 112 may be configured and controlled by the direct device control system 152.

Voltage and Volt-Var Control System 154: The volt-VAR control system 154 may perform on demand voltage reduction or continuous conservation voltage reduction (CVR) operations and integrated two way capacitor control operations and transform tap changing to control reactive power and voltage within a power distribution network.

Substation Automation System 158: In modern substations analog measurement, protection and control mechanisms are replaced with intelligent electronic devices. In some embodiments a local area network may be implemented at the substation to which various computing devices, communication devices and other digital devices, such as the intelligent electronic devices may be communicatively coupled. The local area network may even gather information and data from measurement, control and analyzer devices located downstream, including circuits within power customer's homes. In some instances the substation automation system may include components of other systems, such as the direct device control system 152, the demand response system 164, the distribution management system 170, and the volt VAR control system 154.

Distributed Power Generation System 160: This system 160 controls power generation functions accessible to a utility company to provide power to the power grid.

Power Restoration System 160: This system 160 controls the power restoration operations of a power distribution system. For example, it may be desirable to control switching banks when restoring power so as not to overload a given portion of a power distribution system.

Demand Response System 164: The demand response system includes load control devices located at customer premises along with computing applications for monitoring and controlling the load control devices. The demand response system 164 provides the ability to control the load to reduce or restore power demand in response to various supply conditions. Additional detail is discussed below with regard to the demand response application.

Smart Metering System 166: A smart metering system 166 provides the infrastructure and computer program applications for reading meters remotely via a communication medium, such as a wireless, wired, or power line medium. In some embodiments a utility meter may include a wireless modem. A communication device located at a substation or near a distribution transformer may send commands to the meter and remotely read the meter. In other embodiments, the meter may be read via a PLCS. The acquired data may be sent to a utility command center or other location to store such data and to process such data for customer billing.

Condition Based Maintenance System 168: The condition based maintenance system 168 may analyze data and process it for alarm conditions. When specific criteria are met, maintenance operations may be scheduled for a given component of an affected portion of the power transmission and distribution system 110.

Distribution Management 170: The distribution management system 170 monitors load at various portions of the power transmission and distribution management 110 and may perform load balancing and other power flow control operations.

Planning system 172: The planning system may be used to run various simulations and what if scenarios to evaluate the utility company's ability to meet the power needs of a given region or population.

Asset Management System 174: The asset management system 174 keeps track of the various devices and components of the power transmission and distribution system 110. For example identifying data may be maintained about transformers, sensing devices, communication devices and other equipment which form part of a power transmission and distribution system 110 or the communication infrastructure 114.

Supervisory Control and Data Acquisition (SCADA) System 176: The SCADA system 176 is a distributed industrial network which gathers operational data about the power transmission and distribution system 110, such as the voltage or current output at a substation or at a distribution transformer.

Geographic Information System 178: The geographic information system 178 may include information that relates location to specific events and assets (e.g., equipment).

Work Management System 180: The work management system 180 may perform a scheduling function for deploying technicians and other personnel to perform various jobs, such as periodic maintenance or condition based maintenance.

Fault Management System 182: The fault management system 182 may include applications that process data against various thresholds to predict potential faults and to identify (e.g., predict) and locate actual faults and specify the impacted area to support restoration activities.

Power Distribution Information Management and Control Applications

Figure 2:
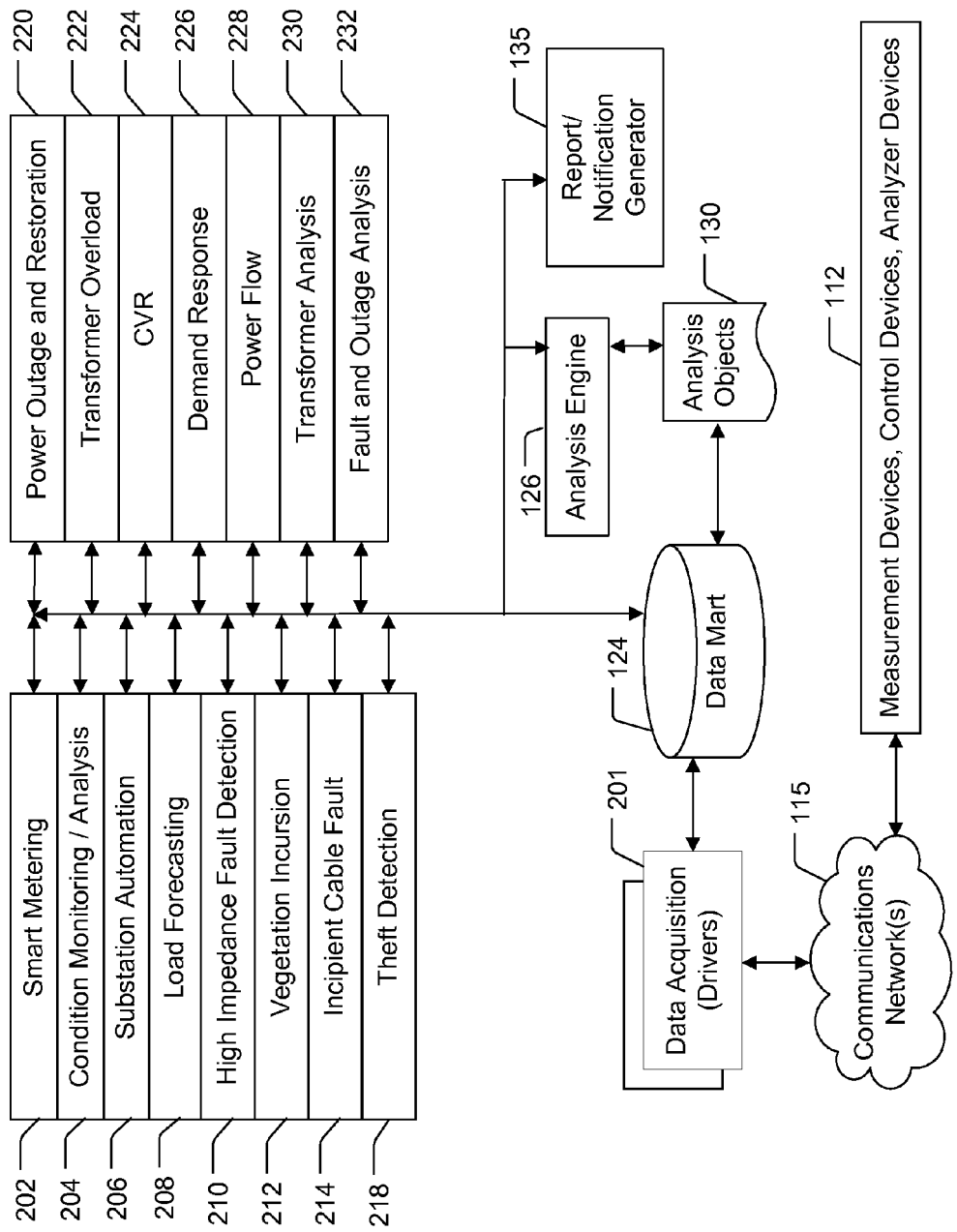
FIG. 2 is a control and data flow diagram of various power transmission and distribution information management and control applications, according to an example embodiment of the present invention.
Figure 3:
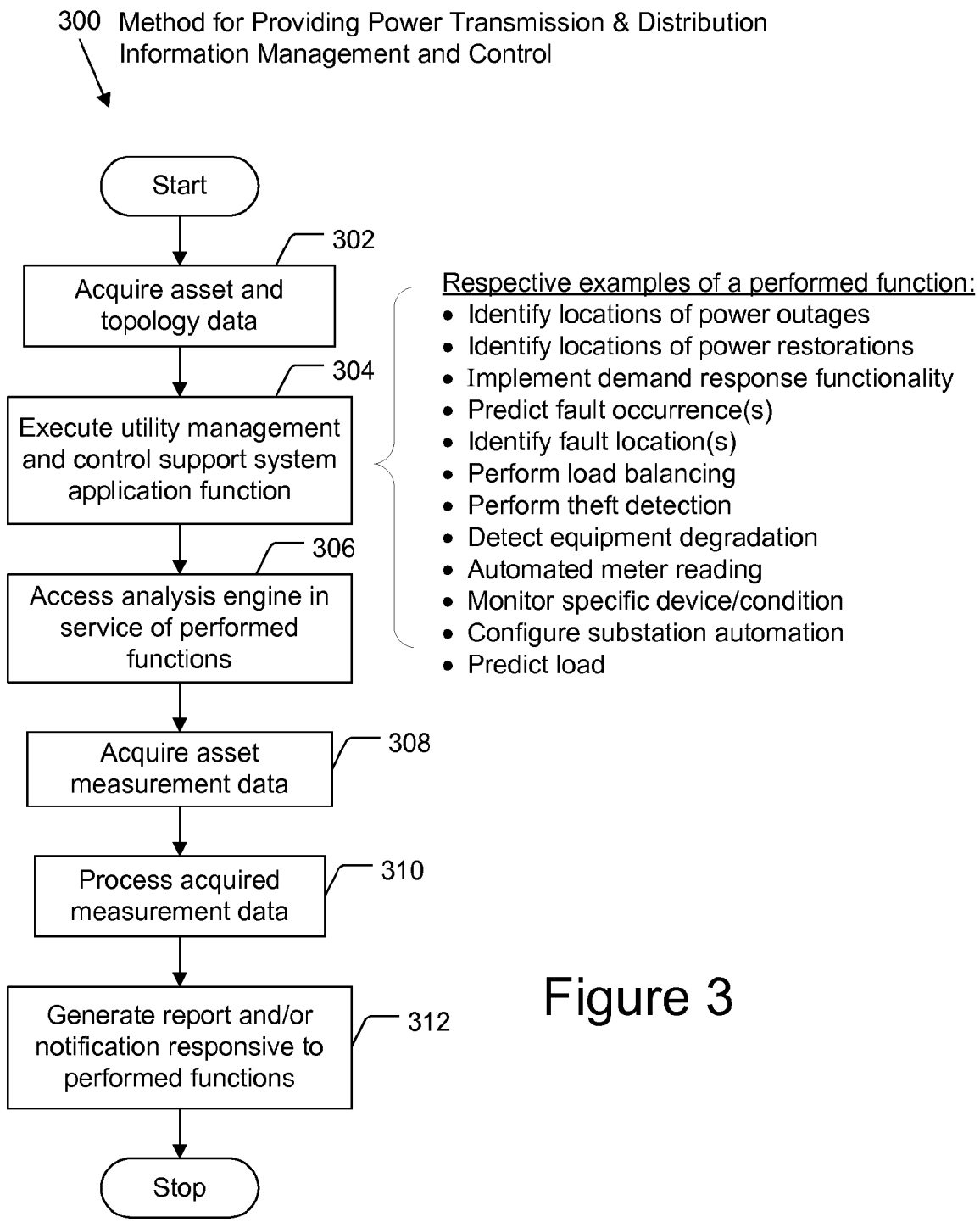
FIG. 3 is a flow chart of a method for providing power transmission and distribution information management and control, according to an example embodiment of the present invention.

FIG. 2 depicts a data and control flow diagram for a PTDIMC 100, according to an example embodiment of the present invention. Various applications 202-236 may be hosted among the utility management and control support systems 140. These applications may perform various functions, such as identifying locations of power outages and restorations, implementing demand response functionality, predicting fault occurrences, identifying fault locations, detecting power theft, or detecting equipment degradation. This list of functions is not exhaustive, as various applications may perform additional functions.

Some or all of these applications 202-236 may constitute or form part of modules that may access the analysis engine 126 to perform the various functions or portions thereof. The applications 202-236 (or associated modules) also may request data from the data mart 124. The analysis engine 126 also may access to data from the data mart 124. A data request may be made through the data service interface of the datamart 124, which selects an appropriate database adaptor to access the appropriate physical database(s) to obtain the desired data. Each adaptor (or driver thereof) may have access to specific schema data of a different database of the datamart. Before routing a data request to the adaptor, the integration server of the data mart, using its map (or dictionary), will convert the universal unique ID (UUID) provided by the application with the data request into the correct local node ID for the adaptor determined to be the best adaptor to service the request. The local node ID is recognizable by the database whereas the UUID is not. In some instances the data may already be stored among the databases of the data mart 124. In other instances, the data may be acquired from any of the measurement devices, control devices and analyzer devices 112, such as by transmitting a request through a communication network 115 (e.g., via SCADA), included within the communications infrastructure 114. Execution of a given application 202-236 or of an object of the analysis engine 126 also may include generation of a report or notification. The report/notification service interface 134 may include a report and notification generator module 135 to create, store, display, print and/or transmit a report or notification. Descriptions of example applications are provided below.

Smart Metering: The smart metering application 202 forms part of the smart metering system 166. Various modules of the application may be executed at various computing devices. For example a scheduler module may determine when data from specific meters is to be acquired. A data control module may store the data in one or more databases. A billing module may access the data to generate customer billing information.

Condition Monitoring and Analysis: The condition monitoring and analysis application 204 may access apparatus measurements, correlate them with power measurements to determine the health of the apparatus and to identify maintenance that is required to prevent an equipment failure. Condition Information about the apparatus and a signature of what constitutes a potential problem accessed for this analysis. The condition monitoring and analysis application may 204 be distinct or form part of any one or more of the following: the analysis engine 126, the direct device control system 152, and the condition based maintenance system 168.

Substation Automation: The substation automation application 206 performs functions for configuring a local area network and its components at a given substation. For example, control messages may be transmitted to substations to configure components therein. Various operations may be scheduled to monitor and maintain substation operations and the power distribution system assets served by the substation.

Load Forecasting: The load forecasting application 208 accesses previously acquired from the data mart 124 and current data from various measurement, control and analyzer devices 112 to forecast load for one or more segments of a power distribution network. For example, various simulations and what if scenarios may be analyzed under various conditions to forecast the load.

High Impedance Fault Detection: The high impedance fault detection application 210 monitors voltage and current (e.g., (e.g., monitoring for a sharp increase in current with a corresponding increase of line impedance or the loss of downstream voltage) at various locations throughout the power transmission and distribution system to identify any high impedance fault occurrences, which may indicate a damaged circuit or a downed conductor). Detection of a high impedance fault may result in an alarm notification.

Vegetation Incursion: The vegetation incursion application 212 detects impedance (or current) transients in vegetative areas and may monitor weather conditions (e.g., wind speed) to determine whether vegetation is touching an un-insulated power line and determine an approximate location. A detailed description of an example of a vegetation incursion application 212 is provided in U.S. patent application Ser. No. 11/439,198, filed May 24, 2006, issued as U.S. Pat. No. 7,626,497, entitled "Power Line Communication Vegetation Management System And Method," which incorporated herein by reference in its entirety for all purposes. Other methods may also be used.

Incipient Cable Fault: The incipient cable fault application 214 detect fault conditions in underground residential distribution (URD) cables. As the URD cable deteriorates, and in particular as the insulation layer deteriorates, moisture may accumulate in spots within the cable. Eventually enough moisture may accumulate to lower the local resistance sufficiently that an arc occurs between the center conductor and the outer neutral. This arc generally occurs at the peak voltage (positive or negative amplitude), which causes a current surge briefly during the arc. As the power line continues to deteriorate, current surges may occur more frequently. The location of the incipient cable fault may be determined to be between the two power distribution transformers where two current sensors (where one sensor detects a current surge and the other does not) are approximately located. The nodes associated with each sensor may transmit notifications upon detecting such a current surge. A detailed description of an example of an incipient cable fault application 214 is provided in U.S. patent application Ser. No. 12/169,223, filed Jul. 8, 2008 entitled "System and Method for Predicting a Fault in a Power Line," which is incorporated herein by reference in its entirety for all purposes.

Theft Detection: By comparing the current output from a transformer with cumulative power meter data of one or more customer premises serviced by the transformer, power theft may be detected and located when a discrepancy is detected. Thus, the node may measure the output current and voltage of a transformer and transmit the information periodically to a remote computer system which compares the data with data from a plurality of meters (which may be automated meters). A detailed description of an example of a theft detection application 218 is provided in U.S. patent application Ser. No. 11/775,209, filed Jul. 9, 2007, entitled "Power Theft Detection System and Method," which is incorporated herein by reference in its entirety for all purposes.

Power Outage and Restoration: A power outage is the loss of voltage on a circuit. There are various potential causes of a power outage but the most common is the loss of voltage due to the opening of a feeder breaker clearing a faulted circuit.

A power outage is a loss of power which may be measured as approximately a zero current flow along a power line or zero voltage on a power line. A power outage may result from equipment failure in a power station, a substation, a transformer, or an overload to the MV power lines (causing a fuse to blow, a switch to open, a recloser to open, etc.). A power outage may also be caused by damage to a power line (e.g., a break) as discussed above. A "brownout" is a term used to refer to a condition in which the voltage of a power line (e.g., a low voltage power line) is below a normal minimum level, as specified for the given distribution system, but greater than zero. Some brownouts, also referred to as voltage reductions, are made intentionally to prevent a power outage. For example, power distribution capacity may be rotated among various districts to avoid total area or regional blackouts when the power draw exceeds or approaches generation capacity.

Power outage may be identified based upon any of several analyses. A voltage drop on both of the energized conductors of a low voltage (LV) power line below a threshold voltage for a predetermined duration may be detected by a node co-located at a transformer correlates well with an imminent power fault and power outage. For example, upon detection of a reduction in voltage of a low voltage power line below a predetermined threshold that remains for a time period (e.g., by measuring the instantaneous voltage over time and averaging the measurements), the node may transmit a last gasp notification to a remote computer system that indicates a power outage (and store data in non-volatile memory). The notification may also include information identifying the transmitting node which may be used by the computer system to determine the location of the outage. Upon processing the notifications from a plurality of nodes, the outage may then be displayed on a map on a display. When power is restored and the node powers up, it may access its non-volatile memory to determine if it powered down because of a power outage and, if so, transmit a notification of the power restoration to the remote computer system for display on a map. A detailed description of an example of a power outage and restoration application 220 is provided in U.S. patent application Ser. No. 12/354,523 filed Jan. 15, 2009, entitled "System, Device and Method for Providing Power Outage and Restoration Notification," which is incorporated herein by reference in its entirety for all purposes.

Transformer Overload: Overload conditions may cause a transformer's windings to operate at a higher temperature, which in turn causes a gradual deterioration in the transformer insulation. Ultimately a transformer in the weakened insulation condition may fail, for example, in response to a lightening strike. Thus, a node co-located at a transformer may monitor the output power of the transformer and may transmit the data (along with data sufficient for identifying the transformer such as a pole number) to a remote computer system, which compares the received data with a rating of the transformer to determine if it is overloaded or underloaded. A detailed description of an example of a transformer overload detection application 222 is provided in U.S. patent application Ser. No. 11/756,858, filed Jun. 1, 2007 entitled, "System and Method for Detecting Distribution Transformer Overload," which is incorporated herein by reference in its entirety for all purposes.

Conservation Voltage Reduction (CVR): Utilities are required to provide power to customer premises within an acceptable voltage range such as, for example, between 114 and 126 volts. Utilities typically regulate substation bus voltage to the high end of the band to ensure that the far end of a medium voltage power line receives adequate voltage to supply the nearby customer premises with the minimum required voltage. However, voltage above a necessary minimum causes an increase in power required to be generated, transmitted and distributed through the power transmission and distribution system 110. Reduction of the voltage to the lower end of the band results in considerable energy savings over time. CVR offers two main benefits. One benefit is that fixed impedance loads, such incandescent lighting, may experience a significant drop in KW power consumption when voltage is lowered. Another benefit is that transformer core loss may drop because core/iron loss is a function of the voltage.

The CVR application 224 monitors voltage sensors distant from the substation (e.g., at a meter or at a distribution transformer and transmitted by an automated meter or node) to obtain the voltages. In addition, capacitor bank controllers are in place with remote communications capability. Capacitor bank measurements and status are continuously monitored. If monitored voltages (substation or end of line) fall outside of thresholds, the application will determine the best control to execute to correct the situation. Various voltage control and VAR control algorithms operate to regulate the voltage supplied by the substation and VAR to their optimum levels. The application allows objective functions to be configured by the utility (loss reduction, demand reduction, enhancing restoration capabilities, etc.).

Utilities can achieve significant improvements in power factor, voltage regulation and reduction in line losses through the optimal application of remote two way controlled capacitor banks. Traditional capacitor applications rely on local measurements and localized control to achieve a portion of the possible benefits. A centralized two way capacitor control solution includes centralized two way capacitor control software, integration with substation SCADA measurement data, and integration with line capacitor banks. The CVR application 224 may include the two way capacitor control program code. Benefits of the centralized two way capacitor control solution Include: reduction of current flowing to supply VAR load, reduction of losses associated with reactive current flow, reduction of voltage drop associated with reactive current flow, freeing of system capacity, and improvement in capacitor bank availability. Utilizing two way measurement and control, the switching of capacitor banks may be automated and optimized by: selection of which feeder to enable/disable a capacitor bank based on real time VAR load and local voltage conditions; selection of which individual capacitor to switch based on real time VAR load and voltage conditions; and real Time alarming of capacitors which fail to operate. Detailed descriptions of examples of a CVR application 224 is provided in U.S. Provisional Application No. 61/045,851, filed Apr. 17, 2008, entitled "System and Method for Improving the Efficiency of a Power Distribution System," which is incorporated herein by reference in its entirety for all purposes.

Demand Response: The system may include a load shed module which includes demand response functionality, which is the ability to control and reduce the load in response to various supply conditions. To provide such functionality various load control devices may be installed at customer premises. For example, a programmable thermostat having a remote access capability may serve as a load control device. Customers may for example give permission to the utility company to adjust the thermostat during high demand situations (e.g., when there is not enough supply to meet demand). The demand response application 226 provides load shedding and may include the functions to detect a high demand situation and remotely access the load control device to reduce demand of a specific load or groups of loads. For example a command may be sent to a thermostat to turn off or turn down the temperature setting of the customer's the air conditioning system. The utility company may do this for one or more customers to reduce the load on a power distribution system. As the demand decreases, the application 226 may restore the settings to select homes, neighborhoods or regions. The utility may also allow consumers to log in via browser based interface to control their own temperature setting and loads. Detailed descriptions of examples of a demand response system 164 and demand response application 226 are provided in U.S. patent application Ser. No. 12/354,262 filed Jan. 15, 2009, entitled "System, Method and Computer Program Product for Providing Demand Response Functionality," which is incorporated herein by reference in its entirety for all purposes.

Power Flow: The power flow application 228 provides load balancing and voltage control functions. The application 228 provides a static representation of all or a portion of a power transmission and distribution system, along with update and modeling features. For example, a model of the power transmission and distribution system may be derived and switches may be shown to be open or closed. Various components may be represented as an electric node. Real time and near real time sensor data may be obtained to measure values to populate the model. Various what if scenarios may be performed to identify and evaluate physical changes to the power transmission and distribution system and, if appropriate, transmit control messages to switches and other devices to change the flow of power.

Transformer analysis: The transformer analysis application 230 may monitor distribution transformers to detect changes in parameters that may be a signature of degraded, poorly installed, or defected transformer. For example, voltage at a plurality of transformers may be monitored by nodes to detect voltage signatures that are predictive of transformer failures such as a short of the turns of a winding (which may be detected by rapid sustained increase in voltage output). Processing the measurement data to detect various trigger events indicative of transformer degradation may be performed. Depending upon the extent of the degradation, maintenance or other responsive steps may be taken to prevent a power distribution system failure. Other signatures may indicate a loose neutral conductor. Also, by determining the power input and the power output, inefficient transformer may be detected. A detailed description of an example of a transformer analysis application 230 is provided in U.S. patent application Ser. No. 12/353,420, filed Jan. 14, 2009, entitled "System and Method for Determining Power Line Equipment Degradation," which is incorporated herein by reference in its entirety for all purposes.

Fault and Outage Analysis: The fault and outage analysis application may process data to determine the type of fault, location of a fault, recommended corrective action(s), and provide a report. In some instances, the location of the fault may also be given by a location of a power outage (e.g., where the outage begins). A detailed description of an example of a portion of a fault and outage analysis application 232 is provided in U.S. patent application Ser. No. 12/354,225, filed Jan. 15, 2009, entitled "Method and Apparatus for Communicating a Power Distribution Event and Location," which is incorporated herein by reference in its entirety for all purposes.

Method of Providing Asset and Information Management and Control

According to an example embodiment of the present invention, a method of providing asset and information management and control may include executing one or more of the PTDIMC applications 202-236. Prior to such execution, the PTDIMC configuration may be modeled or updated. For example, at step 302, asset property data and network topology data may be acquired and stored. Such step may be repeated periodically or after changes to the PTDIMC 100 to update the configuration.

At step 304, an application from among PTDIMC applications 202-236 may be executed. In some instances an application is run automatically based upon a schedule or in response to a condition or trigger event detected by another application or the analysis engine 126. In other instances a technician or other user with sufficient privileges may start the application, such as by entering a command at one of the human machine interfaces 132. Execution of the application may include performing various functions. For example execution of the power outage and restoration application 220 may include identifying the location(s) of power outage(s) and/or the location(s) of power restoration(s). Execution of the demand response application 226 includes implementing demand response functionality. Execution of the high impedance fault detection application 210, incipient cable fault application 214 or fault and outage analysis application 232 may include identifying a location of and/or predicting a fault. Execution of the power flow application 228 may include performing load balancing. Execution of the theft detection application 218 may include identifying a source of power theft. Execution of the transformer analysis application 230 may include identifying one or more transformers or other PTDIMC assets which are underperforming or otherwise degrading. Execution of the smart metering application 202 may include acquiring automated meter reading data. Executing the substation automation application 206 may configure a substation LAN, control equipment or configure processes to be performed at a given power substation.

Execution of the load forecasting application 208 may result in load being predicted for specific scenarios and power transmission and distribution system portions.

In some instances the executed application 202-236 may include a call to the analysis engine 126 at step 306 to perform one or more functions associated with the application. For example an analysis object may be accessed which generates a voltage waveform or performs some other method or calculation. During processing by the analysis engine 126 or one of the applications 202-236, additional data may be requested from the data mart (and/or one or more measurement devices, control devices or analyzer devices 112). Accordingly, in one example at step 308 asset measurement data may be requested from the data mart 124.

At step 310, the acquired data is processed, such as by the analysis engine 126 and/or one of the applications 202-236. Such processing may result in an alarm condition being detected, a fault being identified or located, a power outage location being identified, or some other result consistent with the functions provided by any of the applications 202-236. In some instances, a report and/or a notification also may be generated at step 312. The report may be stored for later viewing, displayed, printed and/or transmitted. Similarly a notification may be logged, stored, displayed, printed, included in a report, and/or transmitted.

One embodiment of the present invention may take the form of a system for processing utility data of a power grid and comprise a datamart comprised of a plurality of physical databases storing utility data, a plurality of applications comprising an automated meter application configured to process power usage data from a plurality of automated meters, a power outage application configured to identify a location of a power outage, and a power restoration application configured to identify a location of a power restoration. The system may include an analysis engine comprising a plurality of analysis objects with each analysis object configured to process data to provide a specific analysis, wherein said analysis engine is accessible via one or more of the plurality of applications, and the system may include a report module configured to receive an output from the analysis engine and to output a report.

The plurality of applications may include a fault analysis application configured to identify a location of a fault, a substation automation application configured to configure one or more components at a substation, a load control application configured to perform load shedding, an incipient cable fault application configured to predict a location of a fault of an underground power cable, a theft detection application configured to identify a location of a power theft, a transformer analysis module configured to identify an overloaded transformer, a high impedance fault detection application configured to identify a location of a high impedance fault, a load forecasting application configured to provide a forecast of power demand; and a conservation voltage reduction application configured to control an output voltage of a substation to reduce power consumption, a power flow application configured to control the flow of power through the power grid, and a vegetation incursion application configured to identify a location of a vegetation incursion The datamart may include a plurality of drivers with each driver having access to data of a specific schema of a different one of the plurality of databases. The analysis engine may be configured to cause said report module to output an alarm notification if processing of utility data satisfies one of a plurality of predetermined conditions.

Another embodiment of the present invention may take the form of a computer program product comprising a computer readable medium encoding a computer program for executing on a computer system to provide a computer process for providing information related to a power distribution system based on information provided by a plurality of nodes, wherein the process comprises providing access to a plurality of physical databases storing utility data, processing the utility data to identify a location of a power outage and output a power outage location, processing the utility data to identify a location of a power restoration and output a power restoration location, transmitting control messages to configure one or more components at a substation; and transmitting control messages to one or more load control devices to perform load shedding. The process may further comprise processing utility data to provide a forecast of power demand of portions of the power grid and to output a forecast report, processing utility data to predict a location of a fault of an underground power cable and to output information identifying a location of the predicted fault, processing utility data to identify a location of a power theft and to output information identifying a location of the power theft; processing utility data to identify an overloaded transformer and to output information identifying the overloaded transformer; processing utility data to identify a location of a high impedance fault, outputting control messages to control an output voltage of a substation; outputting control messages to control the flow of power through the power grid; and outputting an alarm notification if processing of utility data satisfies one of a plurality of predetermined conditions. The computer program product may comprise a plurality of drivers with each driver having access to data of a specific schema of a different one of the plurality of databases.

Yet another embodiment of the present invention may comprise a system for processing utility data of a power grid data. The system may comprise a data management system configured to store the utility data; a fault analyst module configured to process utility data to identify locations of power outages and to output fault location data, a power restoration module configured to process utility data to identify locations of power restorations and to output restoration location data on a map on a display; and a power outage module configured to process utility data to identify locations of power outages and to output power outage location data on a map on a display. The data management system may comprises a datamart having a plurality of physical databases and a plurality of drivers with each driver having access to data of a specific schema of a different one of the plurality of physical databases. The system may further comprise a measurement data processing module configured to process utility data that comprises voltage data derived from measurements taken at a plurality of distribution transformers and to output an analysis report; a meter module configured to receive power usage data derived from a plurality of automated meters and to output billing data; a substation automation module configured to transmit control messages to configure one or more components at a substation; a load control module configured to transmit control messages to perform load shedding; an incipient cable fault module configured to process utility data to predict a location of a fault of an underground power cable and to output an incipient fault location; a theft detection module configured to process utility data to identify a location of a power theft and to output a theft location; a transformer analysis module configured to process utility data to identify an overloaded transformer and to output a transformer report; a high impedance fault detection module configured to process utility data to identify a location of a high impedance fault and to output a location of a high impedance fault; a load forecasting module configured to provide a forecast of power demand and to output a forecast report; a conservation voltage reduction module configured to process utility data to control the output voltage of a substation to reduce power consumption; and a power flow application configured to process utility data to control the flow of power through the power grid; and an alarm module configured to output an alarm notification if processing of utility data satisfies one of a plurality of predetermined conditions.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for processing utility data of a power grid, comprising:
   a fault analysis module configured to identify a location of a fault based on the utility data;
   an incipient cable fault module configured to predict a location of a fault of an underground power cable based on the utility data;
   an alarm module configured to output a notification if processing of the utility data satisfies one of a plurality of predetermined conditions;
   wherein said one of the plurality of predetermined conditions comprises a condition in which a voltage of the power grid is beyond a threshold voltage; and
   a report module configured to receive information from said fault analysis module and said incipient cable fault module and to output a report.

2. The system according to claim 1, further comprising a load control module configured to perform load shedding based on the utility data.

3. The system according to claim 1, wherein said alarm module is configured to process the utility data and to output a first notification if a voltage is below a first threshold and to output a second notification if the voltage is above a second threshold.

4. The system according to claim 1, further comprising a datamart comprised of a plurality of physical databases storing the utility data.

5. The system according to claim 1, further comprising a power flow module configured to control the flow of power through the power grid based on the utility data.

6. The system according to claim 1, further comprising:
   a power outage module configured to process the utility data to identify a location of a power outage; and
   a power restoration module configured to process the utility data to identify a location of a power restoration.

7. A system for processing utility data of a power grid, comprising:
   a datamart comprised of a plurality of physical databases storing the utility data;
   wherein at least some of the plurality of physical databases are physically remote from other of the plurality of physical databases;
   a fault analysis module configured to identify a location of a fault based on the utility data;
   an alarm module configured to output a notification if processing of the utility data satisfies one of a plurality of predetermined conditions;
   wherein said one of the plurality of predetermined conditions comprises a condition in which a voltage of the power grid is beyond a threshold voltage; and
   a report module configured to receive information from said fault analysis module and to output a report.

8. The system according to claim 7, further comprising a load control module configured to perform load shedding based on the utility data.

9. The system according to claim 7, wherein said alarm module is configured to process the utility data and to output a first notification if a voltage is below a first threshold and to output a second notification if the voltage is above a second threshold.

10. The system according to claim 7, further comprising an incipient cable fault module configured to predict a location of a fault of an underground power cable based on the utility data.

11. The system according to claim 7, further comprising a power flow module configured to control the flow of power through the power grid based on the utility data.

12. The system according to claim 7, further comprising a power outage module configured to process the utility data to identify a location of a power outage.

13. The system according to claim 12, further comprising a power restoration module configured to process the utility data to identify a location of a power restoration.

14. A system for processing utility data of a power grid, comprising:
   a datamart comprised of a plurality of physical databases storing the utility data;
   an incipient cable fault module configured to predict a location of a fault of an underground power cable based on the utility data;
   a fault analysis module configured to identify a location of a fault based on the utility data;
   an alarm module configured to process the utility data and to output a first notification if a voltage is below a first threshold and to output a second notification if the voltage is above a second threshold; and
   a report module configured to receive information from said fault analysis module and to output a report.

15. The system according to claim 14, further comprising a load control module configured to perform load shedding based on the utility data.

16. The system according to claim 14, further comprising an incipient cable fault module configured to predict a location of a fault of an underground power cable based on the utility data.

17. The system according to claim 14, further comprising a power flow module configured to control the flow of power through the power grid based on the utility data.

18. The system according to claim 14, further comprising:
   a power outage module configured to process the utility data to identify a location of a power outage; and
   a power restoration module configured to process the utility data to identify a location of a power restoration.

19. The system according to claim 14, wherein at least some of the plurality of physical databases are physically remote from other of the plurality of physical databases.

* * * * *